April 16, 1968  J. ULDERUP  3,378,287
UNIVERSAL JOINT CONSTRUCTION
Filed Feb. 25, 1966
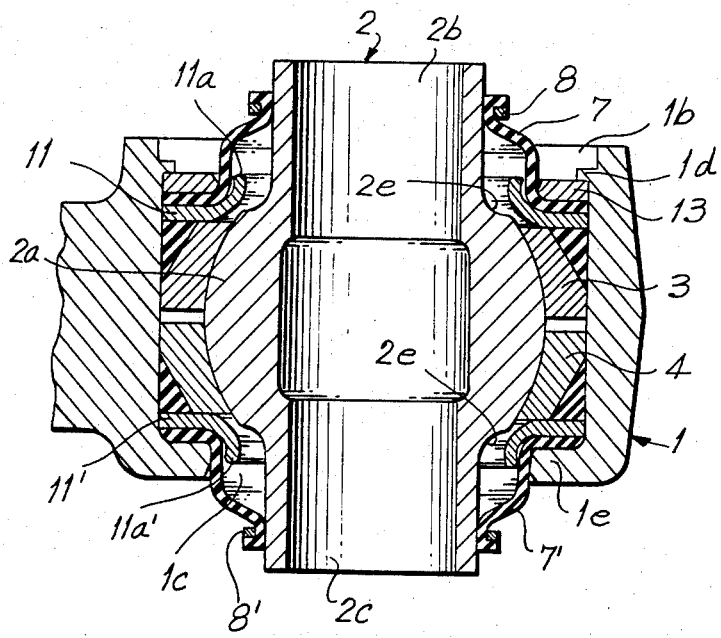
INVENTOR.
JÜRGEN ULDERUP
BY
McGlew & Toren
ATTORNEYS

United States Patent Office 3,378,287
Patented Apr. 16, 1968

3,378,287
UNIVERSAL JOINT CONSTRUCTION
Jürgen Ulderup, Lemforde, Hannover, Germany
Filed Feb. 25, 1966, Ser. No. 530,065
Claims priority, application Germany, May 24, 1965,
U 11,741
6 Claims. (Cl. 287—88)

ABSTRACT OF THE DISCLOSURE

A universal joint comprises a housing which defines a generally cylindrical cavity which is open at each end. The housing includes an internal flange adjacent each open end and a bearing liner is positioned within the housing and includes a spherical surface which slidingly receives a ball-shaped portion of a hinge pin having portions which extend out the respective openings of the housing. A sleeve of flexible material is held around the pin and has its opposite end directed around the flange of the housing. The complete construction includes a ring of shock-resistant material clamped between the bearing liner and the flange and having an end portion which extends upwardly around the flange between the opposite end of the sleeve and the pin portion.

---

This invention relates, in general, to a joint construction and, in particular, to a new and useful universal joint particularly suited for steering mechanisms and axle rods of motor vehicles, and to an improved ball housing and packing construction therefor.

It is known to protect the ball housing of a ball joint by means of a cap- or sleeve-shaped gasket of elastic material which prevents the penetration of foreign particles in water and also provides means for retaining lubrication within the joint housing. Such gaskets are fixed in such a way that they are clamped by means of a border flange in the ball housing between bearing shells and an inwardly directed ring flange formation of the housing which bear on the neck of the ball pin under initial stress and are held in position by a metal ring. Such a joint has the advantage that due to the elastic border flange of the gasket which is clamped between the joint housing and the bearing shell a desired spring action is exerted against the ball at all times so that additional elastic means such as springs, etc. are unnecessary, thus simplifying the construction of the joint. Such joints also provide a stable guidance of the ball pin even in transverse directions. A disadvantage, however, of such joints is that the upper part of the gasket which is clamped in the joint housing is urged against the joint housing during large angular movements of the joint by the hinge pin or similar extensions of the ball and thus the construction is stressed in a harmful manner.

In order to eliminate the disadvantages, a ring disk of sheet steel or other shock-resistant material is arranged according to the invention between the bearing shells and the border flange of the gasket which is clamped in the joint housing, and the inner edge of the ring disk is bent upwardly to the outside of the housing. Because of the provision of the ring disk, the contact between the critical upper part of the gasket and the connecting pin of the ball is avoided because the outwardly directed inner edge of the ring disk serves as a stop for the hinge pin during major angular movements of the joint. In a preferred construction, the outer edge of the ring disk is rounded off in order to avoid any harmful notching effects on the hinge pin.

Accordingly it is an object of the invention to provide a universal joint construction which includes a housing for the ball of a hinge pin which is provided with a flange around the location where the hinge pin extends out of the housing and over which the packing of the housing extends and with a ring member held on the flange between the packing and the housing liner material for the ball which has a rounded edge providing a stop for the accentuated movement of the joint.

A further object of the invention is to provide a ball socket construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

The only figure of the drawings is a partial transverse sectional view of a universal joint constructed in accordance with the invention.

Referring to the drawing, in particular, the invention embodied therein includes a joint housing generally designated 1 in which is supported a ball portion 2a of a joint or hinge pin generally designated 2. In the embodiment illustrated, the hinge pin 2 includes an intermediate ball formation 2a and extension pin portions 2b and 2c extending outwardly from respective ends of the housing 1.

In the embodiment illustrated, the housing 1 includes an opening 1b at the top for the passage of the extension 2b of the hinge pin and an opening 1c at the bottom for the passage of the extension 2c of the hinge pin. The invention is equally applicable where the housing 1 is closed at one end and the hinge pin 2 is of a construction which includes only a single extension.

In accordance with the invention, the housing 1 includes an interior flange portion 1d adjacent the opening 1b and an interior flange formation 1e adjacent the opening 1c. The ball portion 2a of the hinge pin 2 is rotatably supported on two half shell liners or bearings 3 and 4. Each hinge pin extension 2b and 2c is surrounded with an elastic sleeve or covering of elastic or gasket material 7 and 7', respectively. The gaskets are held on the extensions by respective rings 8 and 8'. The opposite ends of the gaskets 7 and 7' are directed around flanges 1d and 1e, respectively. The sealing of the gaskets 7 and 7' within the housing and the holding of the liners 3 and 4 in position is accomplished at the upper opening 1b by directing the gasket 7 between a clamping ring 13 and a ring disk 11 made of a metallic material such as sheet steel. The clamping ring 13 is located below the flange 1d and the ring disk 11 is held between the packing 7 and the liner 3 and it includes an upwardly turned end portion 11a which is directed upwardly around the packing 7 which, in turn, is directed upwardly around the ring 13. The edge of the end portion is rounded.

For the lower opening 1c of the housing 1 it suffices only to employ a ring disk 11' which is held between the liner 4 and the packing 7' and which also includes a rounded end portion 11a' which extends downwardly around the packing 7'. In the construction of the bottom, because the flange 1e extends inwardly further than the flange 1d, a ring 13 need not be employed. The flanges 1d and 1e are advantageously provided with a knurled surface in order to provide a tight gripping action on the ring and the gasket material, respectively. In order to avoid any notch effects in the range of the fillet 2e of the hinge pin 2, the edges 11a and 11a' are rounded.

For those constructions in which the hinge pin 2 does not include, for example, the extension 2b, the opening 1b would be closed by a cover which may extend across the opening and be held in position between the clamping ring 13 and the ring 11 instead of the gasket 7.

While a specific embodiment of the invention has been shown and described in detail to illustrate the application of the inventive principles, it will be understood that the invention may be embodied otherwise without departing from such principles.

What is claimed is:

1. A universal joint comprising a housing defining a generally cylindrical cavity opened at at least one end, said housing having an internal flange adjacent the open end, a bearing liner within said housing having at least a partial spherical surface, a hinge pin having a ball-shaped portion rotatable on the spherical surface of said liner and a pin portion extending through the opening of said housing, a sleeve of flexible material held around said pin at its one end and having its opposite end directed around the flange of said housing, and a ring of shock-resistant material clamped between said bearing liner and said flange and having an end portion extending upwardly around the inner periphery of said flange between said opposite end and the pin toward the opening of said housing.

2. A universal joint according to claim 1, wherein said opposite end of said sleeve of flexible material bears directly on said flange.

3. A universal joint according to claim 1, including a clamping ring disposed between said flange and said opposite end of said sleeve of flexible material.

4. A universal joint according to claim 1, wherein said hinge pin includes a pin portion extending outwardly from each end of said ball-shaped portion, said housing having an opening at each end with the hinge pin portions extending out of respective openings, each of said hinge pin portions including a sleeve of flexible material held around the respective pin portion at its one end and having its opposite end directed around a flange of said housing, and a ring of shock-resistant material clamped between said bearing liner and the respective flange adjacent respective ends of said housing through which said hinge pin portions extend.

5. A universal joint according to claim 4, including a clamping ring disposed between said opposite end of the sleeve of flexible material and the flange of the housing adjacent at least one of the openings.

6. A universal joint according to claim 4, wherein said ball-shaped portion includes a fillet defined at the location of the beginning of the exterior of the pin extension.

References Cited

UNITED STATES PATENTS

| | | | |
|---|---|---|---|
| 1,985,728 | 12/1934 | Ingersoll | 287—90 |
| 2,126,408 | 8/1938 | Peo | 287—90 |
| 2,197,889 | 4/1940 | Katcher | 287—90 |
| 2,274,418 | 2/1942 | Katcher | 287—90 |
| 3,086,801 | 4/1963 | Herbenar | 287—88 XR |
| 3,175,834 | 3/1965 | Wallace et al. | 277—212 |
| 3,329,453 | 7/1967 | Patton | 287—90 |

CARL W. TOMLIN, *Primary Examiner.*

ANDREW KUNDRAT, *Assistant Examiner.*